United States Patent [19]

Kocan

[11] Patent Number: 4,939,736
[45] Date of Patent: Jul. 3, 1990

[54] PROTECTION AGAINST LOSS OR CORRUPTION OF DATA UPON SWITCHOVER OF A REPLICATED SYSTEM

[75] Inventor: Kristin F. Kocan, Warrenville, Ill.

[73] Assignee: AT&T Bell Laboratories, Murray Hill, N.J.

[21] Appl. No.: 247,962

[22] Filed: Sep. 22, 1988

[51] Int. Cl.$^5$ ............................................. G06F 11/20
[52] U.S. Cl. ...................................... 371/8.1; 371/9.1; 371/68.1
[58] Field of Search ................... 371/7, 8.1, 8.2, 68.1, 371/68.2, 9.1

[56] References Cited

U.S. PATENT DOCUMENTS

| | | | |
|---|---|---|---|
| 3,445,811 | 5/1969 | Hashimoto et al. | 371/8.1 |
| 3,451,042 | 6/1969 | Jensen et al. | 371/8.2 |
| 4,382,299 | 5/1983 | Dieterich | 371/8.1 |
| 4,477,895 | 10/1984 | Casper et al. | 370/16 |
| 4,646,286 | 2/1987 | Reid et al. | 370/16 |

OTHER PUBLICATIONS

F. N. Graff, Jr. et al. "The 5ESS Switching System: Physical Design/Hardware", *AT&T Technical Journal*, vol. 64, No. 6, Part 2 (Jul.-Aug. 1985), pp. 1447-1448.

Primary Examiner—Charles E. Atkinson
Attorney, Agent, or Firm—David Volejnicek

[57] ABSTRACT

In a protection-switching arrangement, each optical output of replicated switching nodes (12,13) is connected to the input of an error detector (17,18) and of an optical delay line (19,20); their outputs are in turn connected to inputs of an optical AND gate (21,22). The error detector generates an error signal when it detects error in data at the connected output. The error signal causes the connected AND gate to block signals incoming from the connected delay line. The delay line is sized to ensure that the connected AND gate, when responding to an error signal, blocks signals whose error status is represented by that responded-to error signal. AND gates whose inputs are coupled to like outputs of the switching nodes have their outputs connected to inputs of an optical OR gate (23). The OR gate combines signals received at its inputs into a single signal at its output. The switching nodes may be replaced by computers, transmission lines, or other replicated signal-handling elements.

23 Claims, 2 Drawing Sheets

PROTECTION AGAINST LOSS OR CORRUPTION OF DATA UPON SWITCHOVER OF A REPLICATED SYSTEM

TECHNICAL FIELD

The invention relates to communications in general, and particularly relates to fault-tolerance of communication arrangements in digital optical systems.

BACKGROUND OF THE INVENTION

In diverse technical areas that rely on reliable communication of signals, such as telephony and data transmission and switching, data processing, and process control, it is common to duplicate—or even more extensively replicate—system components (e.g., control units, circuit packs) in order to achieve fault tolerance, and hence reliability.

The replicated components typically operated either in active mode (all components are simultaneously operating in the same state and using the same inputs), or in "hot" standby mode (all components are powered up, but are not necessarily in the same state nor using the same inputs), or in "cold" standby mode (the non-active components need not be powered up).

When using standby components, some form of testing of the active component, or error detection in the data stream(s) processed by the active component, is typically used to determine when a switch of system output (a "protection switch") should be made from the active component to a standby component. Irrespective of whether the standby component is hot or cold, however, the switching action conventionally results in a time period during which data is corrupted.

Alternatively, having the replicated components operate in synchronized active mode can prevent data corruption if three or more components are used (e.g., by "voting" to determine the system output). However, having such redundancy has other problems. These problems include the cost of the extra component(s), increased probability of internal failure (because there is more equipment to fail) and the associated increased maintenance cost, and the extra space and wiring required to accommodate the extra component(s). Therefore, it would be advantageous to have an arrangement which would use only two replicated active components, but which would retain the ability to prevent data corruption.

Additionally, arrangements such as voting, which operate on the possible output signals themselves in order to determine which one should become the system output, introduce the possibility that the arrangements themselves will corrupt the output data which they are intended to safeguard.

Digitized voice is relatively tolerant of data corruption. And for low-speed data, if the time during which data is corrupted as a result of protection switching could be made less than a bit time, either error correction schemes or error detection combined with minimal retransmission could be used effectively to prevent corruption. However, for high-speed data, protection switching causes burst errors which make correction schemes impractical and detection schemes less reliable. Further, these burst errors may last long enough to corrupt the data of more than one user. If a burst error is not detected, myriad problems arise. Even when a burst error is detected, retransmission is needed, and it typically must be invoked either manually or by higher layers of data protocol. Thus, with a grade of service that allows error bursts caused by protection switching, upgrading of the equipment to operate with the protocol options that automate retransmission would normally be required. This may be very costly for high-speed data systems. Also, retransmission following a protection switch may cause temporary overload conditions. For these reasons, the prevention of data corruption rather than the mere curing of corrupted data is more desirable for high-speed data switching communication services.

SUMMARY OF THE INVENTION

This invention is directed to solving the data corruption problems of the prior art while offering the option of having duplicated—as opposed to more extensively replicated—components. According to the invention, functionally-replicated components that operate on a common input signal are monitored for the occurrence of malfunction and, at the same time, their output signals are delayed for the period of time spent in checking for a malfunction. The delayed output signals are used to generate a signal system output signal. But if a malfunction is detected, the delayed output signal which is affected by the malfunction is prevented from being used to generate the system output signal.

Specifically according to the invention, an arrangement is provided for use with replicated signal-handling components—be they transmission links, switching nodes, processors, or any other equipment—which eliminates the previously-described corruption of output. The arrangement uses either an error detection mechanism connected to the outputs of the signal-handling components to detect errors in the output of any of the components, or a fault detection mechanism connected to the components themselves to detect faulty operation of any of the components. The preferred implementation employs error detection on the outputs, as this will detect not only the effects of faults, but also other errors such as noise-induced transient errors, and because the time it takes to detect an error is typically small. For purposes of this application, both faults in components and errors in component outputs will be subsumed in the term "malfunction." The malfunction detection mechanism generates a malfunction signal to indicate detection of a malfunction as any of the signal-handling components.

A signal delay arrangement is connected to the outputs of the signal-handling components. The delay arrangement receives the output signals of the components and outputs them following a delay of time sufficient for the malfunction-detection mechanism to detect a malfunction and to generate the malfunction signal. A system ouput signal generating arrangement is connected to the delay arrangement to receive therefrom the delayed output signals. The generating arrangement outputs a system output signal which correspon to at least one of the received delayed signals. However, the generating arrangement responds to the malfunction signal to output a system output signal which corresponds only to received delayed signals which are not affected by the malfunction. That is, the malfunction signal serves to block a delayed output signal which is affected by the detected malfunction from being used in generating the system output signal, while the delay arrangement provides sufficient time for the malfunction to be detected and the requisite blocking to commence.

The above characterization makes clear that no output information is corrupted or lost as a result of the output of one or more of the replicated components becoming faulty and system output switching, as a consequence, to being based on non-faulty outputs. No loss or corruption results because the output signal delay introduced by the delay arrangement equals or exceeds the time needed to detect the error condition and to effect the blocking of the errored signal. Furthermore, the signals on which the system output will be based are not directly operated on by the malfunction-detection mechanism, but are propagating through the delay mechanism while malfunction detection occurs. Hence, the arrangement is not likely to itself be a corruptor of the system output.

To further limit the possibility that the arrangement itself would bring about failure of a system that uses it, it is desirable to make as many parts thereof as possible out of passive elements. The signal delay arrangement and the system output signal generating arrangement are particularly suited for implementation from passive parts, particularly from passive optical parts. For example, the delay arrangement may comprise lengths of optical fiber, and the generating arrangement may comprise optical AND gates (e.g., transphasors), for selectively passing-through or blocking component output signals. The outputs of the AND gates may further be combined into a single output by means of an optical OR gate (e.g., a coupler) or another optical AND gate.

These and other advantages of the present invention will become apparent from the following description of an illustrative embodiment of the invention considered together with the drawing.

DETAILED DESCRIPTION

Figure 1:
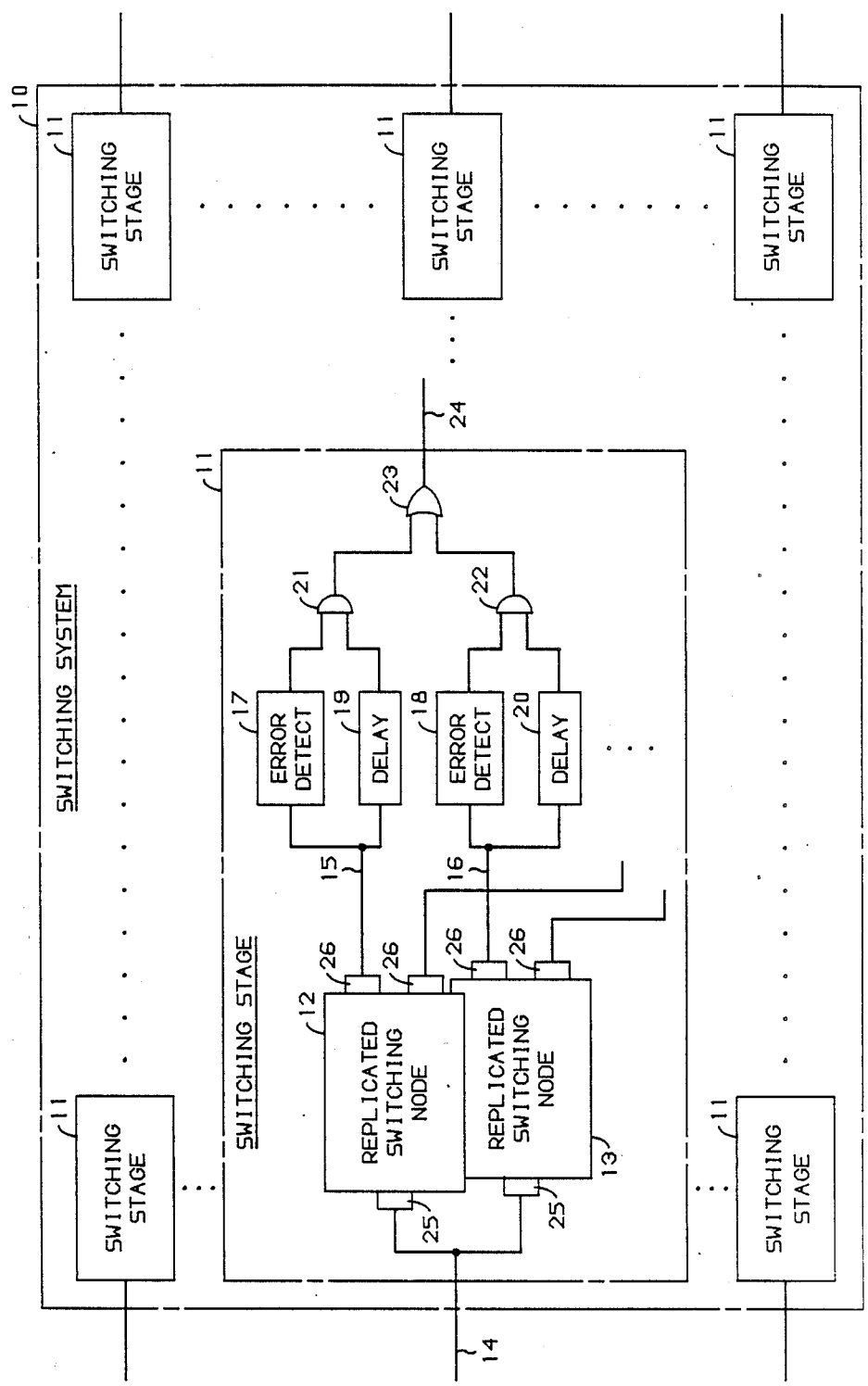
FIG. 1 shows in block diagram form a switching system embodying an illustrative example of the invention, also shown in block diagram form.

FIG. 1 illustrates the invention within the context of a communication switching system 10. As is conventional, system 10 comprises a plurality of switching stages 11 arranged in a switching matrix. An illustrative system of this type is the fast packet switching system disclosed in U.S. Pat. No. 4,484,326.

Switching stages 11 are all the same. Each includes a switching element 12. For reliability purposes switching element 12 has been duplicated in this illustrative example. Each stage therefore includes two switching elements 12 and 13. Both elements 12 and 13 are normally active at the same time. The switching elements are conventional, each illustratively being a packet switching node such as is disclosed in the aforementioned patent.

Signal link 14, which carries input signals to a stage 11, is connected to the inputs of each element 12 and 13. In this illustrative example, stage input signal link 14 is an optical link carrying optical signals, whereas elements 12 and 13 are electrical signal-switching elements. Hence, link 14 is interfaced to the input of each element 12 and 13 by an optical-to-electrical signal converter 25. Such converters are well known in the art.

Each element 12 and 13 has two outputs. The outputs are treated identically—they are each connected to identical apparatus—and hence the connection of only one output will be discussed, with the understanding that the connection of the other output is the same.

First outputs of elements 12 and 13 are connected to element output links 15 and 16, respectively. In this illustrative example, links 15 and 16 also are optical links. Hence, they are interfaced to the outputs of the respective elements 12 and 13 by electrical-to-optical signal converters 26. Such converters are well-known in the art. Each link 15 and 16 is connected to the input of a respective error-detection circuit 17 and 18, and to the input of a respective delay line 19 and and 20. Error-detection circuits 17 and 18 may be any desired error-detection circuits. Many error detection schemes and circuits for implementing them are known in the art. For example, a parity error checker may be used to advantage for this purpose.

Links 15 and 16 are typically electrical links coupled directly to inputs of electrical circuits 17 and 18, and indirectly—via electrical-to-optical conversion circuits 26—to inputs of delay lines 19 and 20. However, for purposes of speed and reliability, it would be preferable to have circuits 17 and 18 be optical circuits. In such an arrangement, links 15 and 16 would be optical links, connected directly to the inputs of circuits 17 and 18. Should electrical circuits 17 and 18 be used in conjunction with optical links 15 and 16, the links would be coupled to the inputs thereof by means of optical-to-electrical conversion circuits such as circuits 25.

For reliability purposes, delay lines 19 and 20 are passive optical delay lines, such as lengths of optical fiber. The delay of lines 19 and 20 is determined by the time needed to detect an error at circuits 17 and 18 and effect blocking of the errored signal at gates 21 and 22. For example, for links 15 and 16 operating at a data speed of 155 Mbps, using parity for error detection on 32 bit words, with a gate speed of approximately 0.01 usec, the delay is about 0.3 usec, or about 150 feet of optical fiber.

The outputs of delay lines 19 and 20 are connected to first inputs of optical AND gates 21 and 22, respectively. Second inputs of gates 21 and 22 are optically connected to outputs of error-detection circuits 17 and 18, respectively. The outputs of gates 21 and 22 are connected to inputs of an optical OR gate 23. The output of gate 23 is connected to a stage output signal link 24. link 24 is an optical link like stage input signal link 14, and gates 21-23 are optical elements known in the art.

Figure 2:
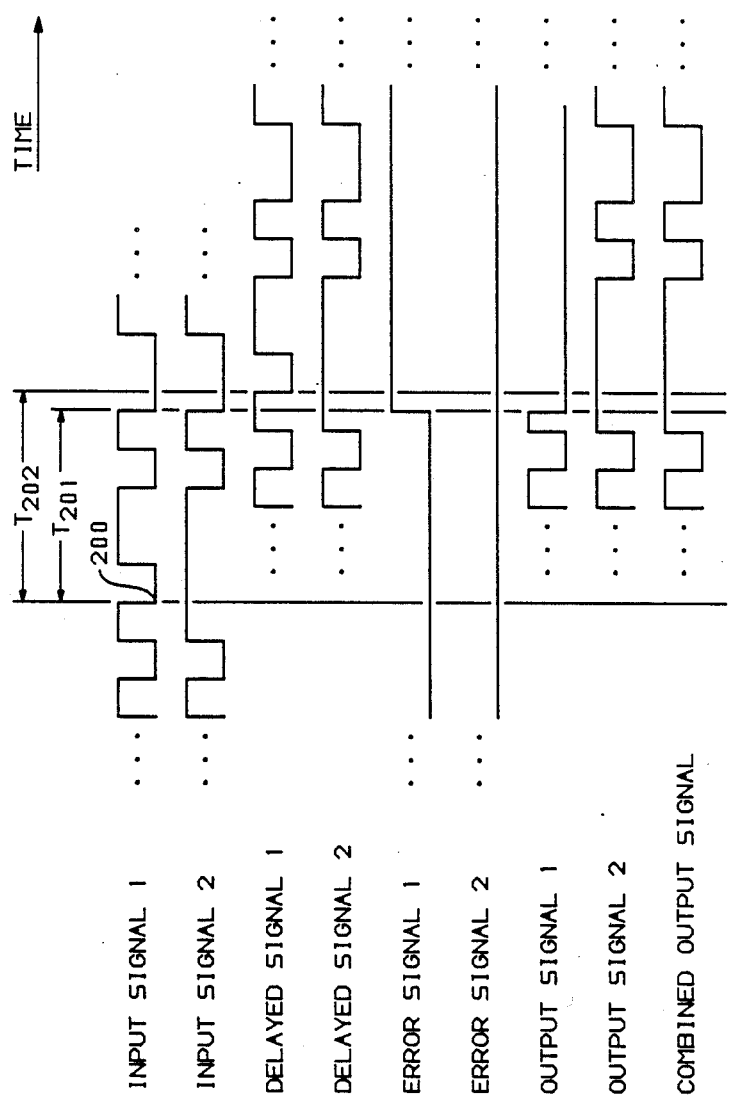
FIG. 2 is a timing diagram for the operation of the system of FIG. 1.

The operation of a switching stage 11, illustrated by the timing diagram of FIG. 2, is as follows. Signals—e.g., speech or data—in digital form are conducted by stage input signal link 14 to both switching nodes 12 and 13. Both nodes switch the incoming signals to one of their outputs—illustratively their first outputs—from whence the signals are conducted by element output links 15 and 16 to error-detection circuits 17 and 18 and delay lines 19 and 20, respectively. The outputs of nodes 12 and 13 are designated in FIG. 2 as input signal 1 and input signal 2, respectively. While the signals are passing through delay lines 19 and 20, error-detection circuits 17 and 18 process the received information to determine if an error therein has occurred, illustratively as a result of a malfunction in the switching elements 12 and 13, and generate signals indicative of the determination. The error signals generated by circuits 17 and 18 are designated in FIG. 2 as error signal 1 and error signal 2, respectively.

During the time that no error is found, both error-detection circuits 17 and 18 generate error signals enabling the associated gates 21 and 22 to pass-through signals received from the associated delay lines 19 and 20. The delayed signals output by delay lines 19 and 20 are designated in FIG. 2 as delayed signal 1 and delayed signal 2, respectively. When an error occurs, illustratively at point 200 in FIG. 2, it takes some time before its occurrence is detected. This time is designated at T 201 in FIG. 2. When the error is found, illustratively by error-detection circuit 17, it generates an output signal disabling the associated gate 21 from passing-through the received information, thereby causing the associated gate 21 to block the received information. The signals output by gates 21 and 22 are designated in FIG. 2 as output signal 1 and output signal 2, respectively. Delay lines 19 and 20 are sized to delay information input thereto for the operating time of circuits 17 and 18, so that the output signals of circuits 17 and 18 arrive at gates 21 and 22 either at the same time as or ahead of the information whose error status they represent. This delay time is designated in FIG. 2 as T 202.

The signal streams output by gates 21 and 22 are combined into a single signal stream by gate 23. If no error is detected by circuits 17 and 18, the signal streams output by gates 21 and 22 are identical, so the combined signal stream output by gate 23 is a duplicate of each of its component signal streams. If an error is detected by circuit 17 or 18, the corresponding signal stream is blocked by the associated gate 21 or 22, and the signal stream output by gate 23 is a duplicate of the remaining, error-free, signal stream input to gate 23. The signal output by gate 23 is designated in FIG. 2 as a combined output signal. When an error in the output of one of the switching elements 12 and 13 is detected and the corresponding signal stream is blocked, at no time is the signal stream output by switching stage 11 interrupted, lost, or otherwise corrupted thereby.

Of course, it should be understood that various changes and modifications to the illustrative embodiment described above will be apparent to those skilled in the art. The changes and modifications can be made without departing from the spirit and the scope of the invention and without diminishing its attendant advantages. It is therefore intended that all such changes and modifications be covered by the following claims.

I claim:
1. An apparatus comprising:
  a first and a second signal-handling component, for performing like signal-handling functions and adapted to receive a common input signal, each component for generating a separate output signal from the common input signal;
  malfunction-detection means connected to both of the components, for detecting occurrence of a malfunction affecting either of the output signals and generating a malfunction signal to indicate detection of the malfunction;
  signal-delay means connected to the first and the second components for receiving the separate output signals, delaying the received signals while the malfunction-detection means are detecting occurrence of a malfunction affecting either of the received output signals that are being delayed, and outputting the received separate output signals after a delay of time sufficient for the malfunction-detection means to detect a malfunction and to generate the malfunction signal; and
  output means connected to the signal delay means for receiving the delayed signals and outputting a system output signal corresponding to at least one of the received delayed signals, the output means responsive to the malfunction signal for outputting a signal corresponding only to a received delayed signal which is unaffected by the malfunction.

2. The apparatus of claim 1 wherein
  the malfunction-detection means comprise means for generating a first and a second malfunction signal to indicate detection of a malfunction at the first and the second component, respectively, and wherein
  the output means comprise means responsive to the first and the second malfunction signals for transmitting at its output a signal corresponding only to the received delayed signal output by, respectively, the second and the first component.

3. The apparatus of claim 1 wherein
  the output means comprise signal-gating means for receiving the delayed signals and transmitting a signal which includes at least one of the received delayed signals, the signal gating means responsive to the malfunction signal for blocking the received delayed signal which is affected by the malfunction from being included in the signal transmitted by the signal-gating means.

4. The apparatus of claim 1 wherein
  the output means comprise means for outputting a selected received delayed signal which is unaffected by the malfunction.

5. The apparatus of claim 1 wherein
  the output means comprise means for combining the received delayed signals into a single signal and outputting the single signal, and means responsive to the malfunction signal for blocking the received delayed signal which is affected by the malfunction from being combined into the single signal.

6. The apparatus of claim 1 wherein
  the signal delay means operate separately from the malfunction detection means.

7. The apparatus of claim 1 wherein
  the malfunction-detection means comprise means for sensing the malfunction at a point in the apparatus that precedes receipt of the output signals by the signal-delay means.

8. The apparatus of claim 1 wherein
  the malfunction-detection means detect the occurrence of a malfunction prior to the affected signal being output by the signal-delay means.

9. An apparatus comprising:
  a first and a second signal-handling component, the components functionally duplicating each other and having a common signal input and each having a separate signal output for generating thereat an output signal from an input signal;
  malfunction-detection means, connected to the signal-handling components, for detecting malfunctions at the components at a point in the apparatus that precedes receipt of the output signals of the signal-handling components by first and second signal-delay means and for generating a first and a second signal to indicate detection of malfunction at the first and the second component, respectively;
  a first and a second signal-gating means connected to the malfunction-detection means, each for receiving the output signal generated by, respectively, the first and the second component, and for selectively transmitting the received signal, each respectively responsive to the first and the second malfunction signal for blocking the received output signal from being transmitted;

the first and the second signal-delay means connected to the output of, respectively, the first and the second signal-handling components to receive the output signal generated thereat, and connected, respectively, to the first and the second signal-gating means to transmit the received output signal to the signal-gating means, each delay means for delaying transmission of a received signal propagating therethrough for a period of time sufficient for the connected gating means, when responding to a malfunction signal, to block those component output signals which are affected by the malfunction that is represented by the responded-to malfunction signal; and output means connected to the first and second signal-gating means to receive signals transmitted by the signal-gating means, for generating a signal corresponding to at least one of the received signals.

10. The apparatus of claim 9 wherein
the output means comprise means for combining signals received from the first and the second signal-gating means into the generated signal.

11. The apparatus of claim 9 wherein
the output means comprise means for selecting one of the signals received from the first and the second signal-gating means as the generated signal.

12. The apparatus of claim 9 wherein
the malfunction-detection means comprise error-detection means connected to the outputs of the signal-handling components for detecting errors in the output of either component.

13. The apparatus of claim 9 wherein
the malfunction-detection means comprise fault-detection means connected to the signal handling components for detecting faults in either component.

14. The apparatus of claim 9 wherein:
the signal-delay means are optical signal-delay means; the signal-gating means are optical signal-gating means; and the signal-combining means are optical signal-combining means.

15. The apparatus of claim 14 wherein:
each optical signal-delay means is a length of optical fiber; each signal-gating means is an optical AND gate; and the signal-combining means is either an optical OR gate or an optical AND gate.

16. The apparatus of claim 9 wherein:
the signal-delay means, the signal-gating means, and the signal-combining means are passive devices.

17. The apparatus of claim 9 wherein:
each signal-handling component is a digital switching node.

18. The apparatus of claim 9 wherein:
the error-detection means comprise a first and a second error-detection circuit each having an input connected to the output respectively of the first and second signal-handling component, for detecting errors in the output of the connected signal-handling component and generating a signal to indicate detection of error.

19. The apparatus of claim 9 wherein
the malfunction-detection means detect the malfunction prior to the signal-delay means transmitting the component output signals which are affected by the malfunction.

20. The apparatus of claim 9 wherein
the first and the second signal-delay means each delay the transmission of the received signal while the malfunction-detection means are detecting occurrence of a malfunction affecting the received signal that is being delayed.

21. A method of protecting a system comprising a pair of components having like signal-handling functions, both of which receive a common input signal and each of which generates from the input signal a separate output signal, against corruption or loss of output signal due to a malfunction, comprising the steps of:
monitoring the system to detect occurrence of a malfunction at either of the duplicated components;
generating a malfunction signal upon detection of a malfunction;
delaying the output signals subsequently to the monitoring for a time sufficient to detect a malfunction and generate the malfunction signal;
generating a system output signal corresponding to at least one of the delayed output signals; and
preventing generation of a system output signal corresponding to a delayed output signal affected by a malfunction, in response to generation of the malfunction signal.

22. The method of claim 21 wherein
the step of generating a malfunction signal comprises the step of
generating the malfunction signal no later than at completion of delaying of the output signals.

23. The method of claim 21 wherein
the step of monitoring comprises the step of
detecting occurrence of a malfunction affecting at least one of the output signals; and
the step of delaying comprises the step of
delaying the output signals while detecting occurrence of a malfunction affecting at least one of the output signals that are being delayed.

* * * * *